United States Patent
Chi

(10) Patent No.: US 7,711,263 B2
(45) Date of Patent: May 4, 2010

(54) FAULT PROTECTION SYSTEM AND METHOD FOR PASSIVE OPTICAL NETWORK

(75) Inventor: Teng-Yuan Chi, Taipei (TW)

(73) Assignee: Inventec Multimedia & Telecom Corporation, Taipei (TW)

(*) Notice: Subject to any disclaimer, the term of this patent is extended or adjusted under 35 U.S.C. 154(b) by 505 days.

(21) Appl. No.: 11/602,268

(22) Filed: Nov. 21, 2006

(65) Prior Publication Data

US 2008/0063394 A1    Mar. 13, 2008

(51) Int. Cl.
*H04B 10/00* (2006.01)
*H04J 14/00* (2006.01)

(52) U.S. Cl. .................. 398/5; 398/3; 398/4

(58) Field of Classification Search .............. 398/3–5
See application file for complete search history.

(56) References Cited

U.S. PATENT DOCUMENTS 6,701,085 B1 * 3/2004 Muller ............... 398/4
6,925,219 B2 * 8/2005 Pfeiffer ............. 385/16

* cited by examiner

*Primary Examiner*—Quan-Zhen Wang
(74) *Attorney, Agent, or Firm*—Bacon & Thomas, PLLC

(57) ABSTRACT

A fault protection method for optical networks is provided. The method includes monitoring intensity of downstream optical signals transmitted through a first route from a rear terminal of a primary optical channel, so as to determine if there occurs any fault; and activating a second route to transmit optical signals when a fault in the primary optical channel is detected, in which the second route is counter to the first route. The present invention also includes a system performing the fault protection method.

20 Claims, 9 Drawing Sheets

FAULT PROTECTION SYSTEM AND METHOD FOR PASSIVE OPTICAL NETWORK

CROSS-REFERENCE TO RELATED APPLICATIONS

This application claims foreign priority benefits under 35 U.S.C. 119 from Taiwan patent application Ser. No. 95133242, filed on Sep. 8, 2006.

BACKGROUND OF THE INVENTION

1. Field of the Invention

The present invention relates to a fault protection system and method for a data communication environment, and more particularly to a fault protection system and method for a passive optical network.

2. Description of the Prior Art

Passive optical network (PON) architecture broadcasts downstream optical signals from optical line terminals (OLTs) to optical network units (ONUs) through optical channels composed of optical fibers and optical splitters. Due to passive elements based infrastructure which does not connect to any power consuming device, a passive optical network is advantaged by the low cost on both network construction and equipment maintenance. The advantages discussed above make the passive optical network a feasible and attractive technique in the field of optical network communication.

FIG. 1A shows a system structure diagram of a conventional passive optical network 100 including a host optical transmitting/receiving module (HOM) 110, a primary optical channel 120, and a plurality of client optical transmitting/receiving modules (COMs) 130-190. The host optical transmitting/receiving module 110 is an OLT broadcasting optical signals embedded with information through the primary optical channel 120. The client optical transmitting/receiving modules 130-190 are ONUs receiving the optical signals through optical splitters (not shown in FIG. 1) from the host optical transmitting/receiving module 110.

The conventional passive optical network 100 as shown in FIG. 1A lacks appropriate fault protection mechanism. When a broken line accidentally occurs somewhere in the primary optical channel 120, for example, some or all client optical transmitting/receiving modules will immediately fail to receive any information from the host optical transmitting/receiving module 110. FIG. 1B shows the passive optical network 100 of FIG. 1A with a broken line fault. If a broken line fault occurred at the "X" point as shown in FIG. 1B, while client optical transmitting/receiving modules 130, 140, and 150 are still capable of receiving host signals, client optical transmitting/receiving modules 160, 170, and 180 connected to the primary optical channel 120 after "X" point will be out of communication with the host optical transmitting/receiving module 110 at once.

FIG. 2 shows a system structure diagram of another conventional passive optical network 200 which contains a host optical transmitting/receiving module (HOM) 210, a primary optical channel 220, a secondary optical channel 222, a plurality of client optical transmitting/receiving modules (COMs) 230-280, and a plurality of optical splitter modules (OSMs) 232-282. In contrast with the structure diagram of FIG. 1A, the passive optical network 200 shown in FIG. 2 contains one more set of redundant equipments for each primary function. Besides the secondary optical channel 222, the host optical transmitting/receiving module 210 contains a primary host optical transmitting/receiving module (primary HOM) 210A and a secondary host optical transmitting/receiving module (secondary HOM) 210B. Each of client optical transmitting/receiving modules 230-280 also contains respective primary and secondary versions (primary COMs and secondary COMs). While the passive optical network 200 possesses a backup capability, it doubles the constructing cost on both client side and host side. Moreover, if any fault should happen simultaneously in both the primary optical channel 220 and the secondary optical channel 222, the structure shown in FIG. 2 is still incapable of keeping the normal communication of all client modules.

In view of the drawbacks of aforementioned conventional structure, there exists a need to provide a method and system to keep overall network communication at accidental faults without increasing cost for a passive optical network.

SUMMARY OF THE INVENTION

It is an object of the present invention to provide an optical network system with fault protection mechanism to keep communication integrality between clients and the host when any accidental fault should happen.

It is another object of the present invention to provide a low cost optical network structure with fault protection capability.

It is yet another object of the present invention to provide an optical network structure with fault protection capability. The optical network structure is able to keep communication integrality when accidental faults happen and recover normal configuration automatically as soon as the faults are removed or fixed.

In accordance with above objects, the present invention provides an optical network system including a host optical transmitting/receiving module, at least one client optical transmitting/receiving module, a primary optical channel, and a fault protection module. The primary optical channel carries a specific optical signal to transmit information from the host optical transmitting/receiving module to the at least one client optical transmitting/receiving module through a first route. The fault protection module connects to a front terminal and a rear terminal of the primary optical channel and the host optical transmitting/receiving module, monitors the specific optical signal at the rear terminal of the primary optical channel, and reconfigures the traveling routes of the specific optical signals when a fault is detected in the primary optical channel, so as to keep a communication integrality for the optical network system.

The present invention also provides a fault protection method for an optical network system, which comprises monitoring intensity of downstream optical signals transmitted through a first route from a rear terminal of a primary optical channel of the optical network, so as to determine if there is a fault occurring in the primary optical channel; and activating a second route to transmit the downstream optical signals when a fault in the primary optical channel is detected, in which the second route is counter to the first route.

DETAILED DESCRIPTION OF THE INVENTION

Figure 3A:
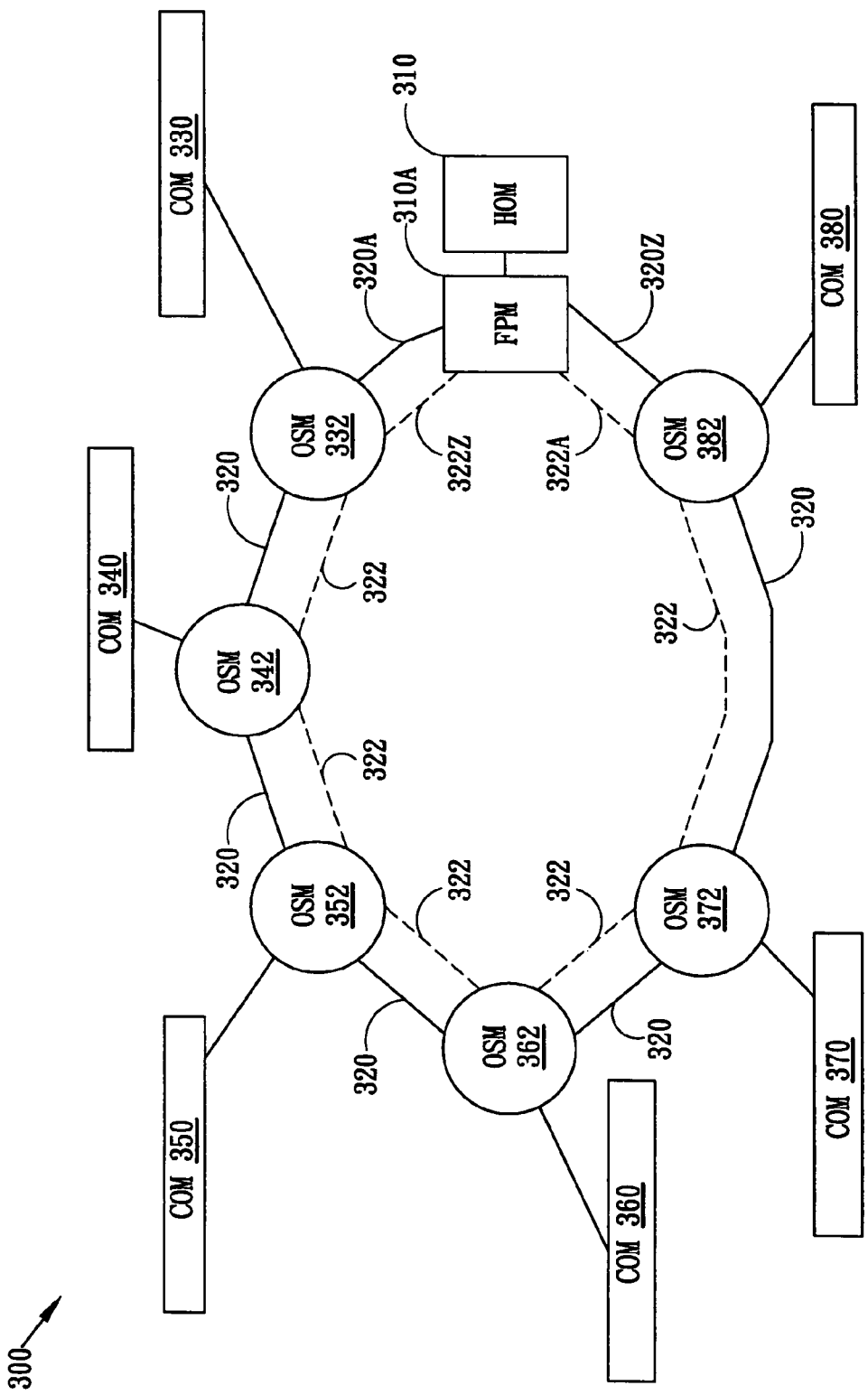
FIG. 3A shows a system structure diagram of a passive optical network in accordance with an embodiment of the present invention.

FIG. 3A shows a system structure diagram of a passive optical network 300 in accordance with an embodiment of the present invention. The passive optical network 300 includes a host optical transmitting/receiving module (HOM) 310, a fault protection module (FRM) 310A, a primary optical channel 320, a secondary optical channel 322, a plurality of client optical transmitting/receiving modules (COMs) 330-380, and a plurality of optical splitter modules (OSMs) 332-382. The host optical transmitting/receiving module 310 is connected to the fault protection module 310A. The fault protection module 310A is connected to the front terminal 320A and the rear terminal 320Z of the primary optical channel 320 as well as the front terminal 322A and the rear terminal 322Z of the secondary optical channel 322. Besides being connected to the fault protection module 310A as described above, the front terminal 320A of the primary optical channel 320 connects to the client optical transmitting/receiving module 330 through the optical splitter module 332. In the same manner, the primary optical channel 320 connects to the client optical transmitting/receiving modules 340-380 through the optical splitter modules 342, 352, 362, 372, and 382 respectively. Also as described above, the rear terminal 320Z of the primary optical channel 320 is connected to the fault protection module 310A. A ring structure is formed by the primary optical channel 320 and all modules connected thereto. Besides being connected to the fault protection module 310A as described above, the front terminal 322A of the secondary optical channel 322 connects to the client optical transmitting/receiving module 380 through the optical splitter module 382. In the same manner again, the secondary optical channel 322 connects to the client optical transmitting/receiving modules 370-330 through the optical splitter modules 372, 362, 352, 342, and 332 respectively. Also as described above, the rear terminal 322Z of the secondary optical channel 322 is connected to the fault protection module 310A. The style of the connection of the secondary optical channel 322 and relative modules is also a ring structure. However, the transmission route of the downstream optical signals in the secondary optical channel 322 is counter to what in the primary optical channel 320.

Although being identified as specific names and different designations, the front terminal 320A and the rear terminal 320Z are both parts of the primary optical channel 320. The specific names and different designations are used for convenience and clarity purpose in relative description. Likewise, the front terminal 322A and the rear terminal 322Z are both parts of the secondary optical channel 322. In the present embodiment, the transmission of optical signals always starts from the front terminal 320A of the primary optical channel 320 and finally passes back to the source (the host 310) through the rear terminal 320Z. In accordance with another embodiment of the present invention, however, if there is any fault occurring, the transmission of optical signals may start from the rear terminal 320Z of the primary optical channel 320.

During normal operation, i.e., when the primary optical channel 320 is integral without any fault, the host optical transmitting/receiving module 310 is capable of broadcasting and transmitting downstream optical signals to any of the client optical transmitting/receiving modules 330-380 through the fault protection module 310A and the primary optical channel 320. Additionally, taking advantage of the ring structure of the primary optical channel 320, the fault protection module 310A can monitor the downstream optical signals traveling through the ring at the rear terminal 320Z of the primary optical channel 320. When the primary optical channel 320 is in normal condition, the fault protection module 310A will keep detecting the traveling back optical signals repeatedly at the rear terminal 320Z; on the contrary, if there exists a fault, such as a broken point, somewhere in the primary optical channel 320, the fault protection module 310A will fail to detect any downstream optical signal at the rear terminal 320Z. Accordingly, the fault protection module 310A is capable of real-time detecting any fault occurring in the primary optical channel 320 through the ring structure thereof. Similarly, due to the ring structure, when the secondary optical channel 322 is employed to transmit the downstream optical signals, the fault protection module 310A can detect any fault in the secondary optical channel 322 in real time at the rear terminal 322Z thereof. Besides fault monitoring capability, the fault protection module 310A can select the feasible optical channel or channels for optical signal transmission through elements such as optical switches. For example, the fault protection module 310A can select the primary optical channel 320 and/or the secondary optical channel 322 to carry the downstream optical signals broadcast from the host optical transmitting/receiving module 310 to client modules.

A variety of typical fault protection mechanisms for the passive optical network 300 in accordance with the present invention will now be described.

Figure 1A:
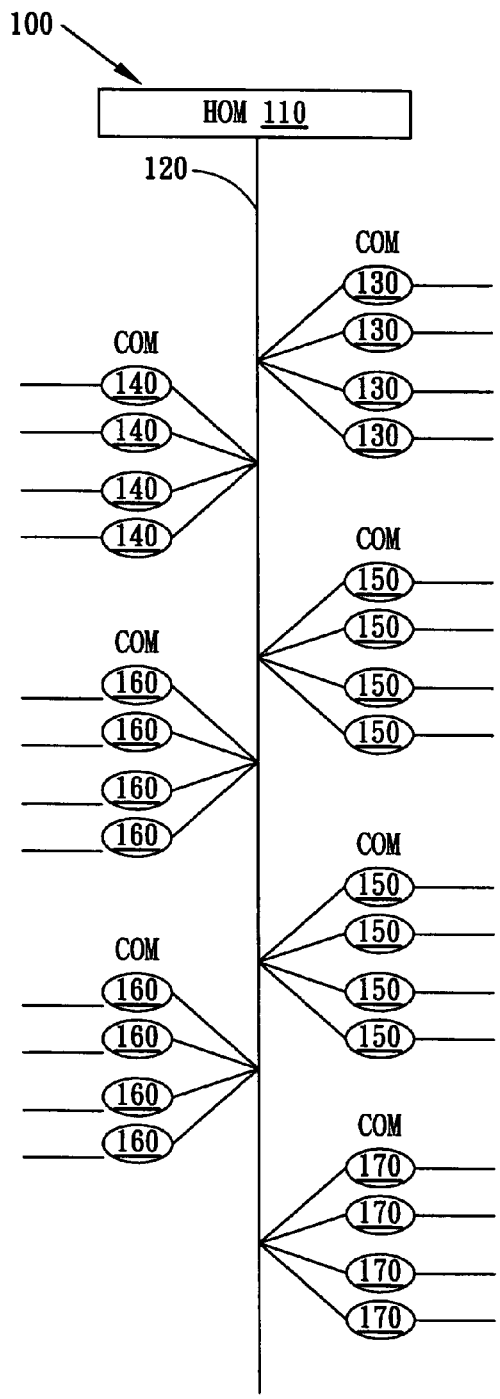
FIG. 1A shows a system structure diagram of a conventional passive optical network.
Figure 1B:
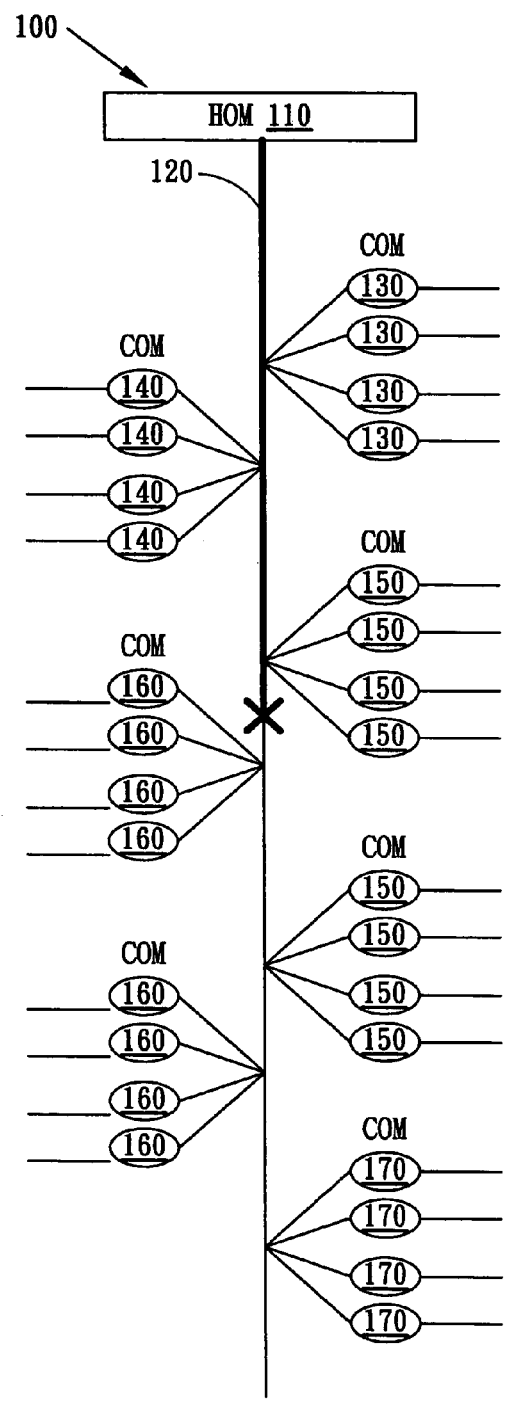
FIG. 1B shows a fault occurring in the passive optical network of FIG. 1A.
Figure 2:
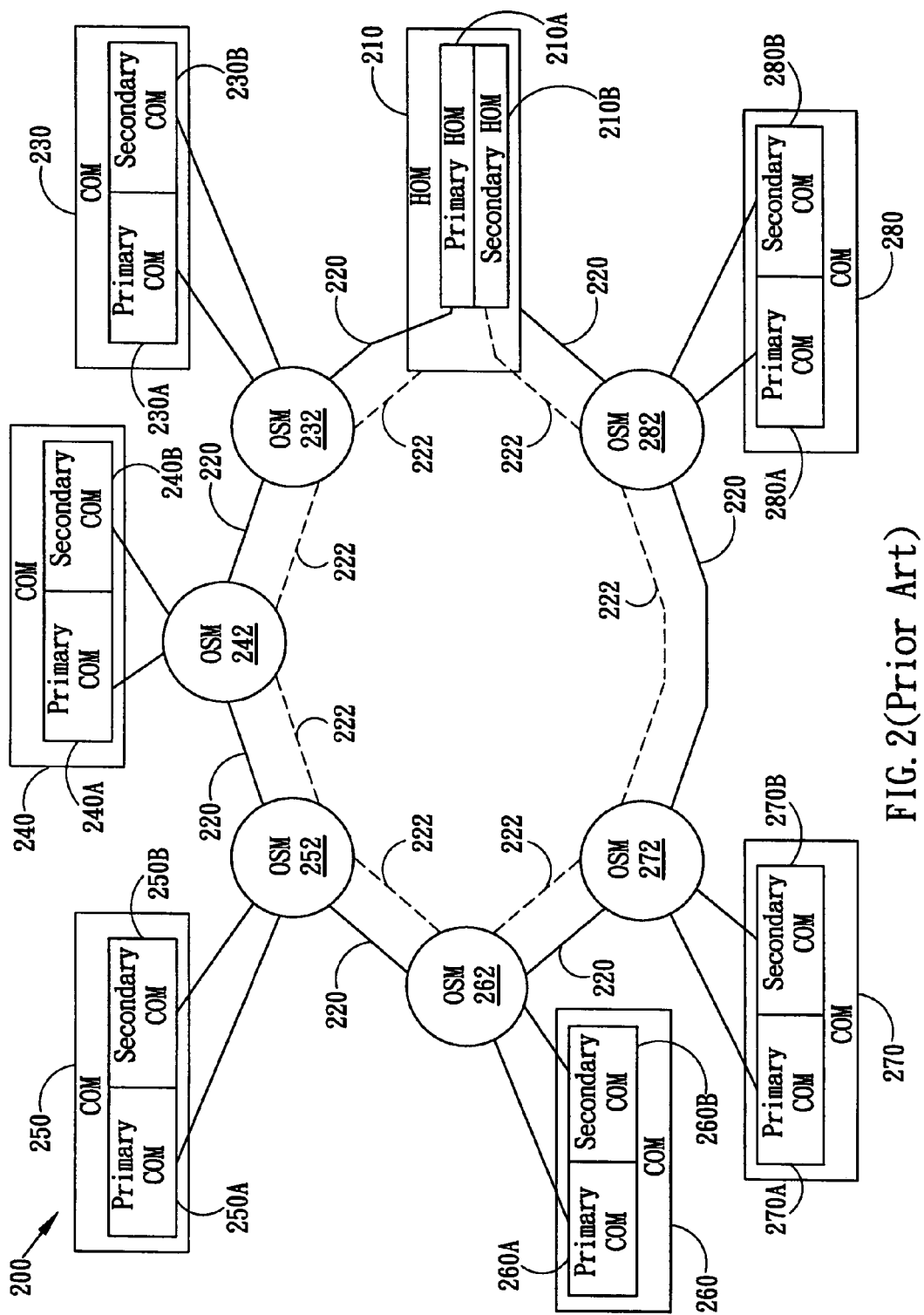
FIG. 2 shows a system structure diagram of another conventional passive optical network.
Figure 3B:
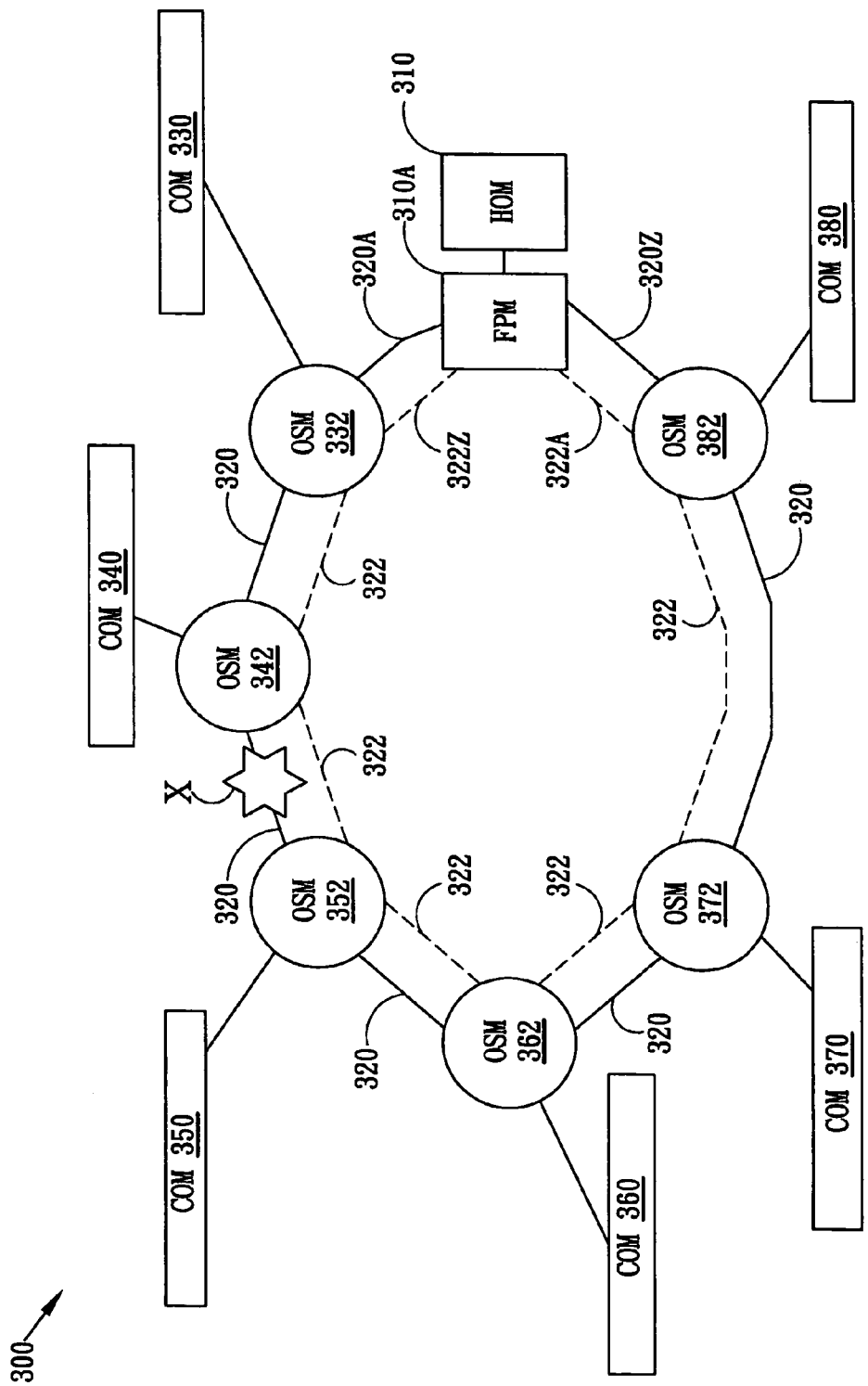
FIG. 3B illustrates a situation that the primary optical channel is faulty but the secondary optical channel is normal in the passive optical network shown in FIG. 3A.

FIG. 3B illustrates a situation that the primary optical channel 320 is faulty but the secondary optical channel 322 is in normal condition in the passive optical network 300 shown in FIG. 1A. When the primary optical channel 320 is broken at point X but the secondary optical channel 322 is integral without any fault, the fault protection module (FPM) 310A becomes unable to detect any downstream optical signal at the rear terminal 320Z of the primary optical channel 320. The fault protection module 310A will activate the secondary optical channel 322, that is, make the secondary optical channel 322 starting to carry the downstream optical signals from the host optical transmitting/receiving module (HOM) 310. Since the secondary optical channel 322 is integral without any fault, the fault protection module 310A will be able to detect the downstream optical signals at the rear terminal 322Z thereof. When the secondary optical channel 322 is determined to be in good condition by successful detection of signals at the rear terminal 322Z, the communication through the primary optical channel 320 may be stopped and all transmission are by way of the secondary optical channel 322 in this case.

Figure 3C:
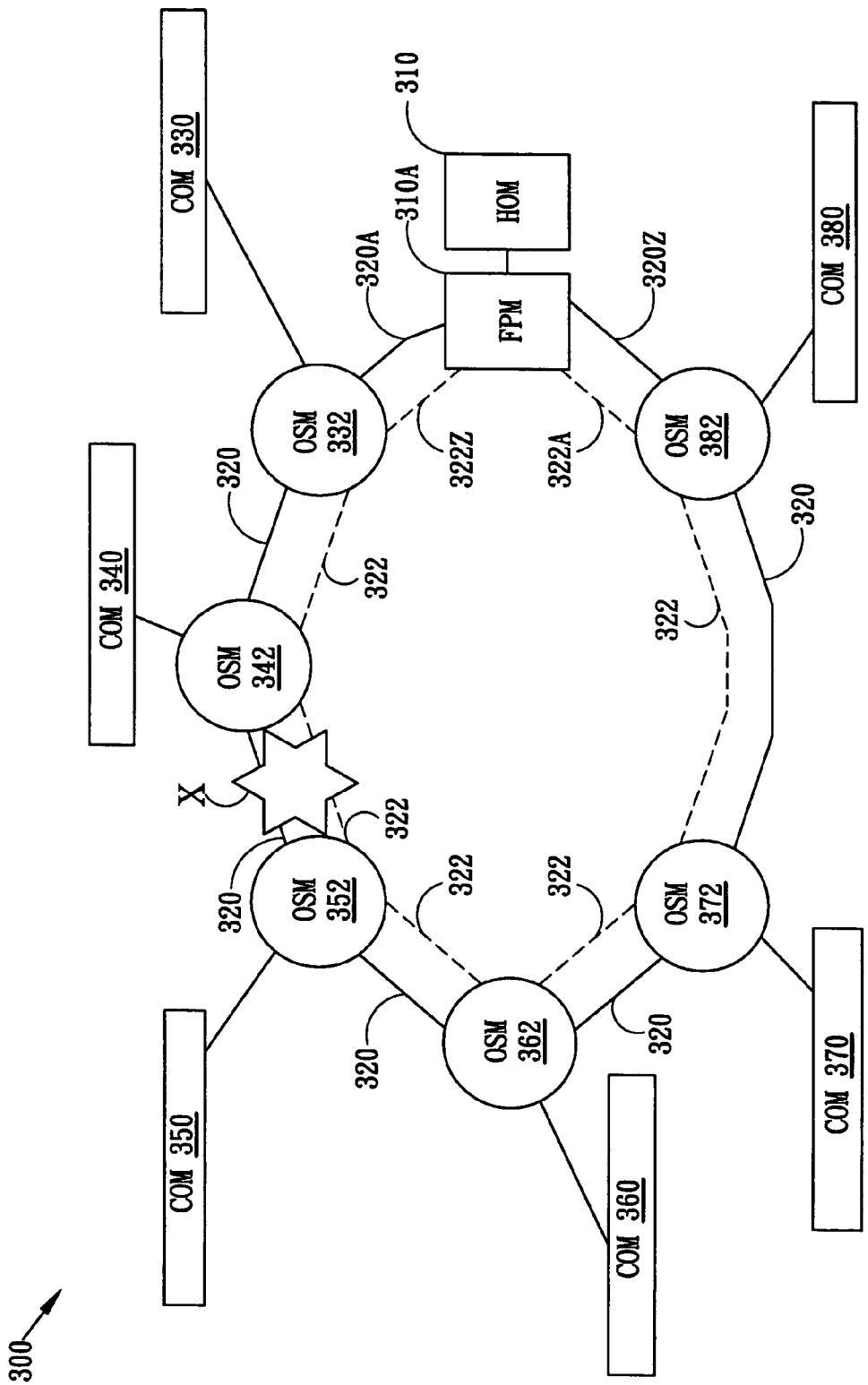
FIG. 3C illustrates a situation that the primary optical channel and the secondary optical channel are both faulty in the passive optical network shown in FIG. 3A.

If the primary optical channel 320 and the secondary optical channel 322 are in the same optical cable, or in different but near cables, it is possible that they are broken at the same location simultaneously. FIG. 3C illustrates another situation that the primary optical channel 320 and the secondary optical channel 322 are faulty simultaneously in the passive optical network 300 shown in FIG. 1A. When the primary optical channel 320 and the secondary optical channel 322 are both broken at point X, the fault protection module (FPM) 310A can not detect any downstream optical signal at the rear terminal 320Z either. The fault protection module 310A will then activate the secondary optical channel 322, that is, make the secondary optical channel 322 start to carry the downstream optical signals from the host optical transmitting/receiving module (HOM) 310. However, since the secondary optical channel 322 is also broken, the fault protection module 310A will fail to detect any downstream optical signal at the rear terminal 322Z, therefore the secondary optical channel 322 is also determined to be faulty. In this case, the communication through the primary optical channel 320 will be kept. In other words, the communications of the client optical transmitting/receiving modules 330-340 before the broken point X will be through the primary optical channel 320, but the communications of the client optical transmitting/receiving modules 350-380 after the broken X will be through the secondary optical channel 322.

The numbers of the client optical transmitting/receiving modules (330-380) and the optical splitter modules (332-382) are for example only. The present invention is not intended to be limited thereon.

Figure 4:
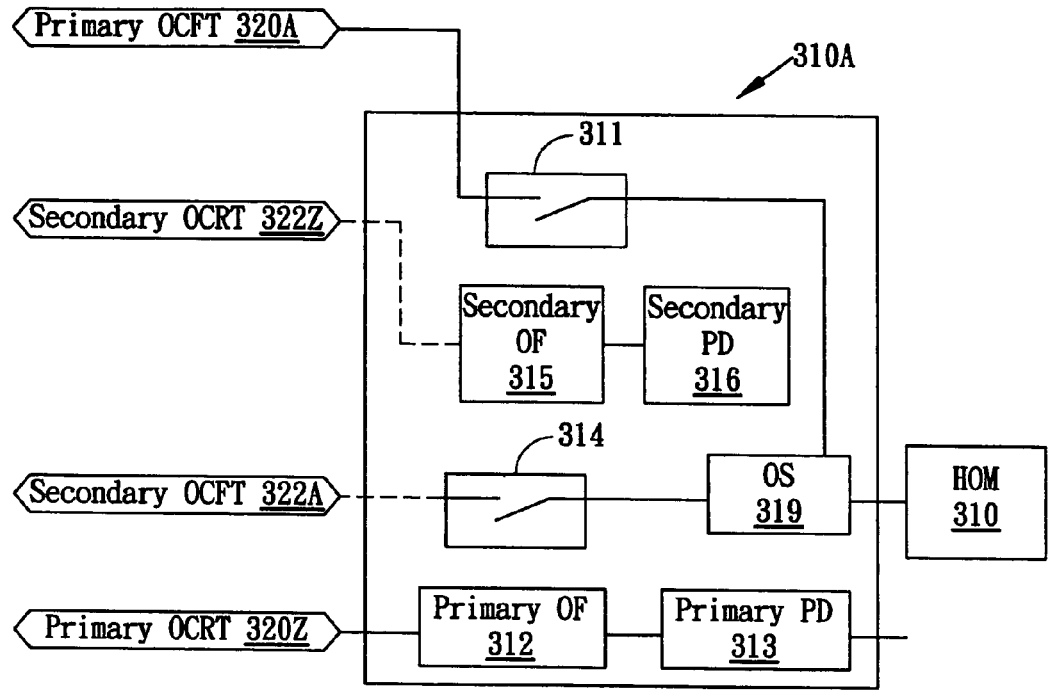
FIG. 4 shows a diagram of an embodiment of the fault protection module shown in FIG. 3A.

FIG. 4 shows a diagram of an embodiment of the fault protection module 310A shown in FIG. 3A. The fault protection module 310A includes a primary optical switch 311, a primary optical filter (primary OF) 312, a primary photo diode (primary PD) 313, a secondary optical switch 314, a secondary optical filter (secondary OF) 315, a secondary photo diode (secondary PD) 316, and an optical splitter (OS) 319. Being connected to the front terminal 320A of the primary optical channel 320 (Primary OCFT), the primary optical switch 311 is configured to form or cut off the communication between the primary optical channel 320 and the host optical transmitting/receiving module (HOM) 310. The primary optical filter 312 is connected to the rear terminal 320Z of the primary optical channel 320 (Primary OCRT) and is configured to filter out optical signals with frequencies other than that of the downstream optical signals. The primary photo diode 313 is connected to the primary optical filter 312 and is configured to measure the intensity of the downstream optical signals. The secondary optical switch 314 is connected to the front terminal 322A of the secondary optical channel 322 (Secondary OCFT) and is configured to form or cut off the communication between the secondary optical channel 322 and the host optical transmitting/receiving module 310. The secondary optical filter 315 is connected to the rear terminal 322Z of the secondary optical channel 322 (Secondary OCRT) and is configured to filter out optical signals with frequencies other than that of the downstream optical signals. The secondary photo diode 316 is connected to the secondary optical filter 315 and is configured to measure the intensity of the downstream optical signals. The optical splitter 319 is connected to the host optical transmitting/receiving module 310, the primary optical switch 311, and the secondary optical switch 314, and is configured to direct the optical signals from the host optical transmitting/receiving module 310 to the primary optical channel 320 and the secondary optical channel 322 through the two optical switches 311 and 314 respectively.

In accordance with other embodiments of the present invention, the host optical transmitting/receiving module 310 has a plurality of optical signal output terminals. The optical splitter 319 in the fault protection module 310A then can be omitted in such kind of embodiments.

Following description refers to FIG. 3A, FIG. 3C, and FIG. 4.

When the passive optical network 300 operates in normal condition and the primary optical channel 320 is integral, the primary optical switch 311 is turned on and the secondary optical switch 314 is turned off. Accordingly, all optical signals are transmitted through the primary optical channel 320, and the primary photo diode 313 will keep detecting the downstream optical signals from the rear terminal 320Z of the primary optical channel 320.

When the primary optical channel 320 is faulty but the secondary optical channel 322 is normal (FIG. 3B), the primary photo diode 313 fails to detect any downstream optical signal. In this situation, the secondary optical switch 314 will be turned on such that the optical signals from the host optical transmitting/receiving module 310 can be transmitted through the secondary optical channel 322. Since the secondary optical channel 322 is integral in this case, the secondary photo diode 316 will keep receiving or detecting the downstream optical signals. The primary optical switch 311 may thus be turned off such that all optical signals are transmitted through the secondary optical channel 322.

When both the primary optical channel 320 and the secondary optical channel 322 are faulty (FIG. 3C), the primary photo diode 313 fails to detect any downstream optical signal. In this situation, the secondary optical switch 314 will be turned on such that the optical signals from the host optical transmitting/receiving module 310 can be transmitted through the secondary optical channel 322. However, since the secondary optical channel 322 is also faulty somewhere, the secondary photo diode 316 fails to detect any downstream optical signal from the rear terminal 322Z of the secondary optical channel 322. Thus, the primary optical switch 311 will be turned on. The communication before the faulty point (such as point X in FIG. 3C) is through the primary optical channel 320 and the communication after the faulty point will be through the secondary optical channel 322.

Figure 5:
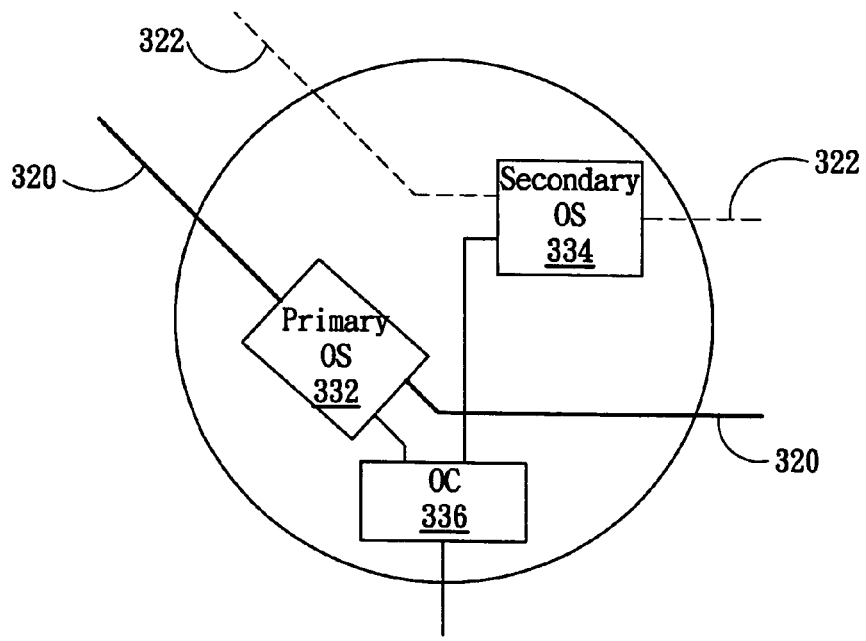
FIG. 5 shows a diagram of an embodiment of the optical splitter module shown in FIG. 3A.

FIG. 5 shows a diagram of an embodiment of an optical splitter module (330-380) shown in FIG. 3A. The exemplified optical splitter module includes a primary optical splitter (Primary OS) 332, a secondary optical splitter (Secondary OS) 334, and an optical coupler (OC) 336. The primary optical splitter 332 and the secondary optical splitter 334 are respectively coupled on the primary optical channel 320 and the secondary optical channel 322 and respectively receive the optical signals from prior optical splitter module (or the fault protection module 310A in both extreme ends). Optical splitters 332 and 334 then direct part of the received optical signals to next optical splitter module (or the fault protection module 310A in both extreme ends) and direct remaining part of the received optical signals to the optical coupler 336. The optical coupler 336 is an optical splitter with the original input end functioning as an output end and the original output ends functioning as input ends. The optical coupler 336 receives the optical signals from the primary optical splitter 332 and the secondary optical splitter 334 and in turn directs the received optical signals to a respective client module. Note that there is always exactly one of the primary optical splitter 332 and the secondary optical splitter 334 will output optical signals in all cases described above (including normal and faulty cases). In other embodiments of optical splitter modules (330-380), the optical coupler 336 can be omitted. The function of the optical coupler 336 is then replaced by appropriate mechanism in the client optical transmitting/receiving modules.

Figure 6:
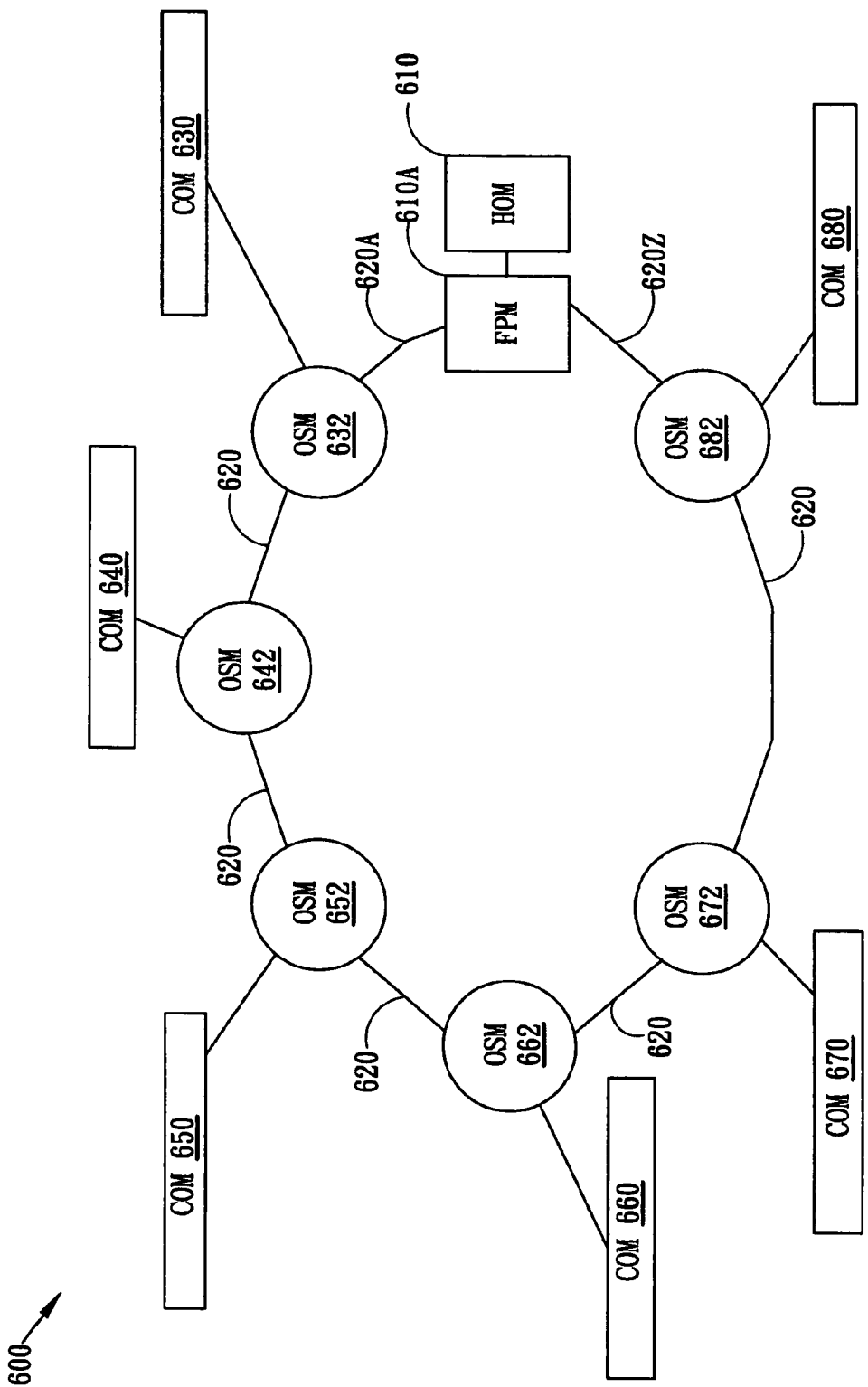
FIG. 6 shows a system structure diagram of another passive optical network in accordance with an embodiment of the present invention.

FIG. 6 shows a system structure diagram of a passive optical network 600 in accordance with another embodiment of the present invention. The system of FIG. 6 is similar to what shown in FIG. 3 except that no secondary optical channel is included. The passive optical network 600 includes a host optical transmitting/receiving module (HOM) 610, a fault protection module (FPM) 610A, a primary optical channel 620, a plurality of client optical transmitting/receiving modules (COMs) 630-680, and a plurality of optical splitter modules (OSMs) 632-682. FIG. 6 is basically identical with FIG. 3 except that no secondary optical channel is there. The fault protection module 610A only connects to a front terminal 620A and a rear terminal 620Z of the primary optical channel 620. The fault protection module 610A monitors downstream optical signals for any fault at the rear end 620Z of the primary optical channel 620. When any fault is detected, the fault protection module 610A will add a new route to transmit the downstream optical signals by initializing transmitting optical signals not only through the front terminal 620A but also through the rear terminal 620Z. In other words, the traveling direction of optical signals before a fault point (such as a broken point) is counter to the traveling direction of optical signals after the fault point. The client optical transmitting/receiving module(s) before the fault point receive signals transmitted from the front terminal 620A, but the client optical transmitting/receiving module(s) after the fault point receive only signals transmitted from the rear terminal 620A of the primary optical channel 620.

Now please refer to FIG. 7A, FIG. 7B, and FIG. 6 for description below.

Figure 7A:
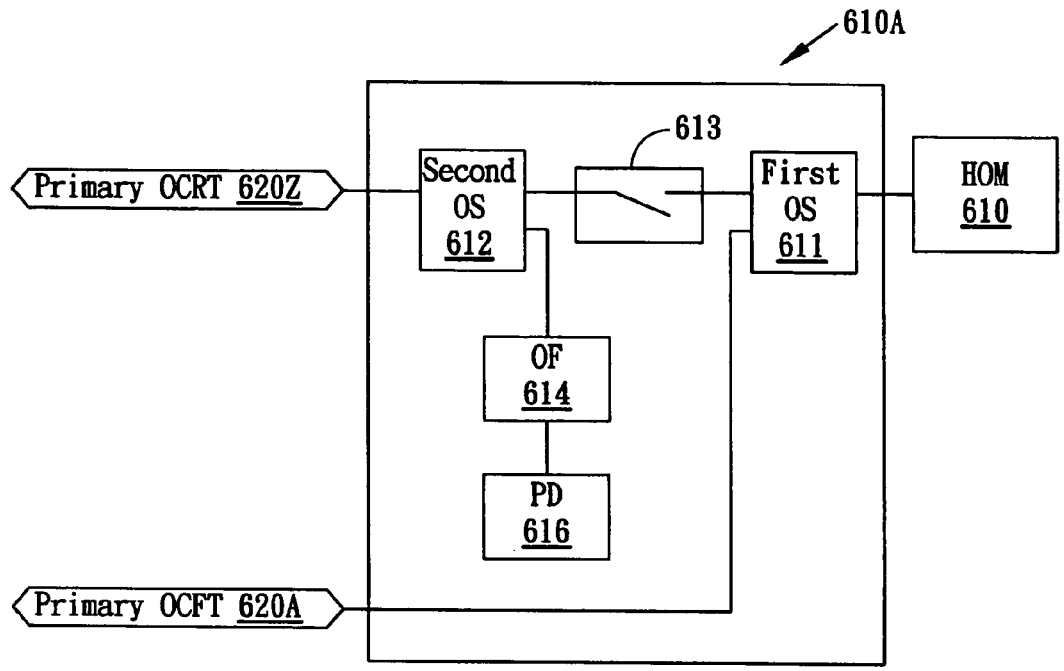
FIG. 7A shows a diagram of an embodiment of the fault protection module shown in FIG. 6.
Figure 7B:
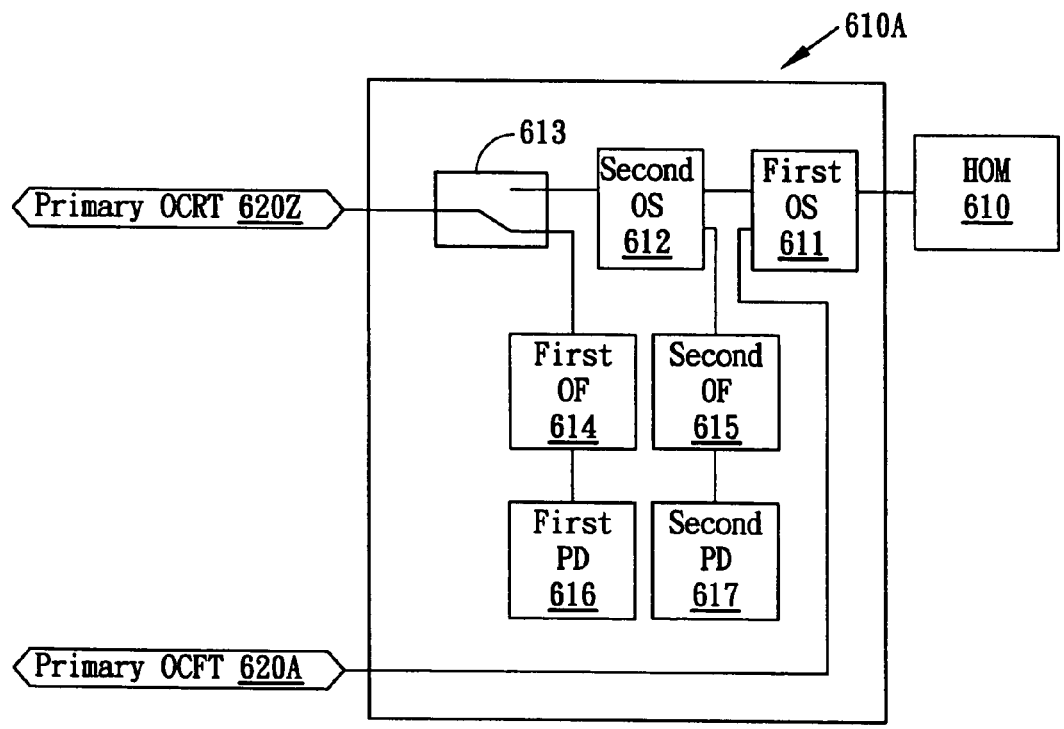
FIG. 7B shows a diagram of another embodiment of the fault protection module shown in FIG. 6.

FIG. 7A shows a diagram of an embodiment of the fault protection module 610A in FIG. 6. The exemplified fault protection module 610A includes a first optical splitter (First OS) 611, a second optical splitter (Second OS) 612, an optical switch 613, an optical filter (OF) 614, and a photo diode (PD) 616. The first optical splitter 611 is connected to the host optical transmitting/receiving module (HOM) 610, the optical switch 613, and the front terminal 620A of the primary optical channel 620 (Primary OCFT). The optical switch 613 is connected between the first optical splitter 611 and the second optical splitter 612, so as to form or cut off the connection between the first optical splitter 611 and the second optical splitter 612. An output terminal of the second optical splitter 612 is connected to the optical switch 613 and functions as an input terminal. The second optical splitter 612 is further connected to the rear terminal 620Z of the primary optical channel 620 (Primary OCRT) and the optical filter 614. The original input terminal of the second optical splitter 612 may function either as an output terminal or as an input terminal depending on different cases as described below. The optical filter 614 is connected to the photo diode 616.

When the passive optical network 600 is in normal operation, the primary optical channel 620 is integral without any fault and the photo diode 616 can keep receiving and detecting downstream optical signals through the optical filter 614. In this normal situation, the optical switch 613 is turned off and the downstream optical signals from the host optical transmitting/receiving module 610 is broadcast out through the front terminal 620A of the primary optical channel 620. When a fault occurs and the photo diode 616 fails to detect any downstream optical signal, the optical switch 613 will then be turned on and the downstream optical signals from the host optical transmitting/receiving module 610 will be delivered out through both the front terminal 620A and the rear terminal 620Z of the primary optical channel 620. The communication before the fault point (such as a broken point) will be through the front terminal 620A, and the communication after the fault point will be through the rear terminal 620Z of the primary optical channel 620. While acting as an input terminal during normal operation, the input terminal of the second optical splitter 612 will act as an output terminal so as to pass optical signals through the rear terminal 620Z.

When the photo diode 616 can detect downstream optical signals again after a fault occurring, the fault situation is considered to be fixed and the optical switch 613 will be turned off to make the passive optical network 600 back to the normal operation and all downstream communication broadcast through the front terminal 620A. As can be noted from above description, the auto-recovering capability is a feature of the present invention.

FIG. 7A shows a diagram of an embodiment of the fault protection module 610A in FIG. 6. The exemplified fault protection module 610A includes a first optical splitter (First OS) 611, a second optical splitter (Second OS) 612, an optical switch 613, a first optical filter (First OF) 614, a second optical filter (Second OF) 615, a first photo diode (First PD) 616, and a second photo diode (Second PD) 617. The first optical splitter 611 is connected to the host optical transmitting/receiving module (HOM) 610, the second optical splitter 612, and the front terminal 620A of the primary optical channel 620 (Primary OCFT). The second optical splitter 612 is connected to the optical switch 613 and the second optical filter 615. The optical switch 613 is connected to the second optical splitter 612, the first optical filter 614, and the rear terminal 620Z of the primary optical channel 620 (Primary OCRT), so as to switch the rear terminal 620Z to connect to either the second optical splitter 612 or the first optical filter 614. The first optical filter 614 is connected to the first photo diode 616. The second optical filter 615 is connected to the second photo diode 617. In spite of the addition of one more optical filter and one more photo diode, the operation of FIG. 7B is similar to that of FIG. 7A. When a fault is detected, a counter route starting from the rear terminal 620Z of the primary optical channel 620 is initialized to keep the communication after the fault point. The communication of the counter route coexists and cooperates with the original route to keep an integral communication in fault situation.

Figure 8:
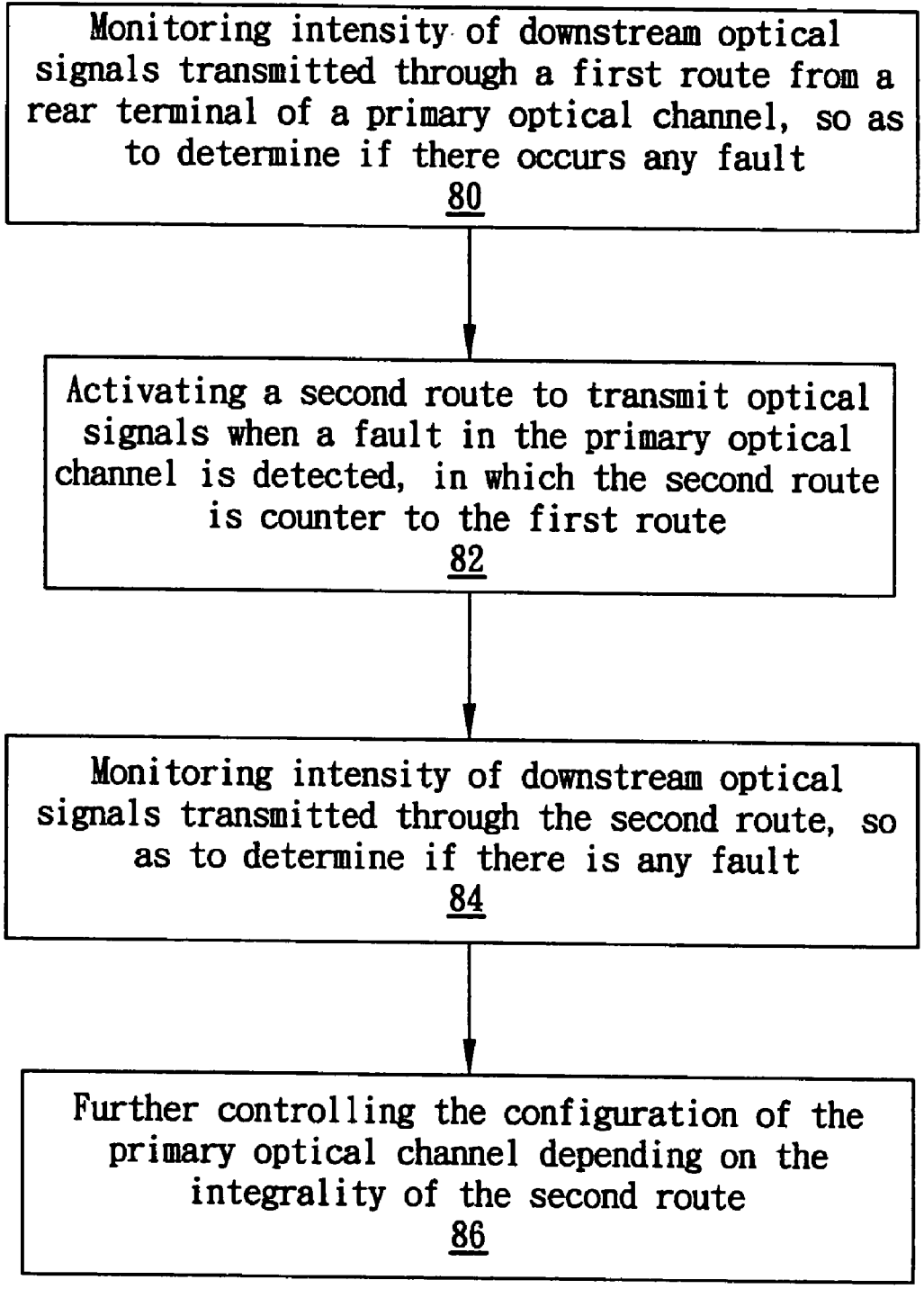
FIG. 8 shows a flow diagram of a fault protection method for an optical network in accordance with an embodiment of the present invention.

According to embodiments detailed above, it should be understood that the present invention also provides a fault protection method for an optical network. FIG. 8 shows the steps of a fault protection method for an optical network in accordance with an embodiment of the present invention. The fault protection method includes monitoring intensity of downstream optical signals transmitted through a first route from a rear terminal of a primary optical channel, so as to determine if there occurs any fault (step 80); activating a second route to transmit optical signals when a fault in the primary optical channel is detected, in which the second route is counter to the first route (step 82); monitoring intensity of downstream optical signals transmitted through the second route, so as to determine if there is any fault (step 84); and further controlling the configuration of the primary optical channel depending on the integrality of the second route (step 86). The second route mentioned in step 82 can be an optical route formed in the secondary optical channel 322 as shown in FIG. 3A or an optical route starting from the rear terminal 620Z of the primary optical channel 620 as shown in FIG. 6. An embodiment having a secondary optical channel will cut off the communication in the primary optical channel in step 86 if the secondary optical channel is determined to be integral without any fault in step 84. This situation is corresponding to what shown in FIG. 3B. On the contrary, if the secondary optical channel is determined to also have a fault as shown in FIG. 3C, then the primary optical channel will be remained active. In other words, whether the configuration of the primary optical channel is further controlled to change or not depends on the integrality of the secondary optical channel as described in step 86. Some embodiments, such as those without a secondary optical channel, can attain the fault protection purpose by executing only a portion of the steps shown in FIG. 8.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An optical fiber network system, comprising:
   a host optical transmitting/receiving module;
   a splitter to split a downstream signal from the host optical transmitting/receiving module into two downstream signals;
   at least one client optical transmitting/receiving module;
   a primary optical channel carrying one of the downstream optical signals to transmit information from said host optical transmitting/receiving module to said at least one client optical transmitting/receiving module through a first route from a front terminal to a rear terminal of the primary optical channel; and
   a secondary optical channel carrying the other of the downstream optical signals to transmit information from said host optical transmitting/receiving module to said at least one client optical transmitting/receiving module through a second route from a front terminal to a rear terminal of the secondary optical channel if a broken-line fault is detected in the first route in said primary optical channel; wherein the transmission direction of said other downstream optical signal in the second route is counter to the first route;
   a broken-line fault protection module connected to the front terminal and second route to transmit said the rear terminal of said primary optical channel, the front terminal and the rear terminal of said secondary optical channel and said host optical transmitting/receiving module; wherein said broken-line fault protection module monitoring said one downstream optical signal at the rear terminal of said primary optical channel to detect the broken-line fault in said primary optical channel, activating the other downstream optical signal from the front terminal of said secondary optical channel and cutting off communication in said primary optical channel when the broken-line fault is detected in the first route in said primary optical channel;
   wherein said broken-line fault protection module also monitoring said other downstream optical signal at the rear terminal of said secondary optical channel to detect a broken-line fault in said secondary optical channel when said secondary optical channel is activated, reactivating the first route to transmit said one downstream optical signal again from the front terminal of said primary optical channel when the broken-line fault is detected in the second route in said secondary optical channel.

2. The system as claimed in claim 1, wherein said broken-line fault protection module comprises: a primary optical switching element configured to change connection status between said host optical transmitting/receiving module and said primary optical channel;
   a primary optical measuring element configured to determine if the broken-line fault occurring is said primary optical channel by monitoring intensity of said one downstream optical signal;
   a secondary optical element configured to change connection status between said host optical transmitting/receiving module and said secondary optical channel; and
   a secondary optical measuring element configured to determine if the broken-line fault occurring in said secondary optical channel by monitoring intensity of said other downstream optical signal;
   wherein said primary optical switching element is turned on and said secondary optical channel is in normal operation; said secondary optical switching element is turned on when said primary optical measuring element detects the broken-line fault occurring in said primary optical channel; and after said secondary optical switching element is turned on, if said secondary optical measuring element further detects the broken-line fault occurring in said secondary optical channel, said primary optical switching element will remain turned on, otherwise said primary optical switching element will be turned off.

3. The system as claimed in claim 2, wherein said broken-line fault protection module further comprises a primary optical filter and a secondary optical filter respectively connected to said primary optical measuring element and said secondary optical measuring element so as filter out optical signals with frequencies different from that of said one downstream optical signal.

4. The system as claimed in claim 3, wherein said broken-line fault protection module further comprises a optical splitter connected to said host optical transmitting/receiving module, said optical switching element, and said secondary optical switching element, so as to respectively direct said one downstream optical signal said primary optical channel or said other downstream optical signal to said secondary optical channel that are respectively connected to said optical switching element and said secondary optical switching element.

5. The system as claimed in claim 2, wherein said primary optical measuring element and said secondary optical measuring element are photo diodes.

6. The system as claimed in claim 1, further comprising as least one optical splitter module connected to said at least one client optical transmitting/receiving module, said primary optical channel, and said secondary optical channel.

7. The system as claimed in claim 6, wherein said at least one optical splitter module consists of only passive elements.

8. The system as claimed in claim 1, wherein said broken-line fault protection module comprises: a first optical splitter configured to receive said one downstream optical signal form said host optical transmitting/receiving module and connected to the front terminal of said primary optical channel;
   a second optical splitter connected to the rear terminal of said primary optical channel;
   an optical measuring element configured to determine if the broken-line fault occurring in said primary optical channel by monitoring intensity of said one downstream optical signal; and
   an optical switching element connected between said first optical splitter and said second optical splitter;

wherein said optical switching element is turned on to activate a counter optical route starting from the rear terminal of said primary optical channel when said optical measuring element detects the broken-line fault.

9. The system as claimed in claim as claimed in claim 8, wherein said broken-line fault protection module further comprises an optical filter for filtering out optical signals with frequencies different from that of said one downstream optical signal.

10. The system as claimed in claim 8, wherein said optical measuring element is a photo diode.

11. The system as claimed in claim 8, further comprising ay least one optical splitter module connected to said at least one client optical transmitting/receiving module and said primary optical channel.

12. The system as claimed in claim 11, wherein said at least one optical splitter module consists of only passive elements.

13. The system as claimed in claim 1, where said broken-line fault protection module comprises: a first optical splitter configured to receive said one downstream optical signal from said host optical transmitting/receiving module and connected to the front terminal of said primary optical channel;

a second optical splitter connected to said first optical splitter;

a first optical measuring element configured to determine if the broken-line fault occurring in said primary optical channel by monitoring intensity of said one downstream optical signal at the rear terminal of said primary optical channel;

a second optical measuring element configured to determine if the broken-line fault occurring in said primary optical channel by monitoring intensity of said one downstream optical signal form said second optical splitter; and an optical switching element connected between the rear terminal of said primary optical channel and said second optical splitter;

wherein said optical switching element is switched such that the rear terminal of said primary optical channel is connected to said second optical splitter so as to activate a counter optical route starting from the rear terminal of said primary optical channel when said first optical measuring element detects the broken-line fault.

14. The system as claimed in claim 13, wherein said broken-line fault protection module further comprises a first optical filter and a second optical filter for filtering out optical signals with frequencies different form that of said one downstream optical signal.

15. The system as claimed in claim 13, wherein said first optical measuring element are photo diodes.

16. The system as claimed in claim 13, further comprising at least one optical splitter module connected to said at least one client optical transmitting/receiving module and said primary optical channel.

17. The system as claimed in claim 16, wherein said at least one optical splitter module consists of only passive elements.

18. The system as claimed in claim 1, further comprising cutting off the communication in the second route when said one downstream optical signal through the first route is detected again at the rear terminal of the primary optical channel.

19. A broken-line fault protection method for an optical fiber network, the method comprising:
   (a) receiving a signal from a host optical transmitting/receiving module;
   (b) splitting the received signal into two downstream signals;
   (c) monitoring intensity of one of the downstream optical signals transmitted through a first route from a rear terminal of a primary optical channel of the optical fiber network, so as to determine if there is a broken-line fault occurring in the primary optical channel;
   (d) activating a second route formed in a secondary optical channel other than the primary optical channel to transmit the other of the downstream optical signals from the front terminal of said secondary optical channel and cutting off communication in said primary optical channel when the broken-line fault in the primary optical channel is detected, wherein the transmission direction of said other downstream optical signal of the second route is counter to the first route; and
   (e) monitoring intensity of said other downstream optical signal transmitted through the second route at the rear terminal of said secondary optical channel when said secondary optical channel is activated and reactivating said first route to transmit said one downstream optical signal again from the front terminal of the primary optical channel when a broken-line fault is detected in the second route in said secondary optical channel.

20. The method as claimed in claim 19, further comprising cutting off the communication in the second route when said one downstream optical signal through the first route is detected again at the rear terminal of the primary optical channel.

\* \* \* \* \*